(12) United States Patent
Wei

(10) Patent No.: US 12,091,126 B2
(45) Date of Patent: Sep. 17, 2024

(54) BEARING SEAT AND HEADSET

(71) Applicant: TIEN HSIN INDUSTRIES CO., LTD., Taichung (TW)

(72) Inventor: Wei-Chih Wei, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 144 days.

(21) Appl. No.: 17/751,691

(22) Filed: May 24, 2022

(65) Prior Publication Data

US 2023/0382486 A1 Nov. 30, 2023

(51) Int. Cl.
| | |
|---|---|
| B62K 21/06 | (2006.01) |
| B62K 19/32 | (2006.01) |
| F16C 17/10 | (2006.01) |
| F16C 23/04 | (2006.01) |
| F16C 23/08 | (2006.01) |
| F16C 35/077 | (2006.01) |

(52) U.S. Cl.
CPC .............. B62K 21/06 (2013.01); B62K 19/32 (2013.01); F16C 17/10 (2013.01); F16C 23/045 (2013.01); F16C 23/084 (2013.01); F16C 35/077 (2013.01); *F16C 2326/20* (2013.01)

(58) Field of Classification Search
CPC .... F16C 23/043; F16C 23/045; F16C 23/084; F16C 35/077; B62K 19/32; B62K 21/06
See application file for complete search history.

(56) References Cited

U.S. PATENT DOCUMENTS

| | | | | |
|---|---|---|---|---|
| 2,397,164 | A * | 3/1946 | Shafer | F16C 23/084 |
| | | | | 384/906 |
| 3,807,819 | A * | 4/1974 | Zimmer | F16C 19/385 |
| | | | | 384/558 |
| 4,190,302 | A * | 2/1980 | Lynn | F16C 33/74 |
| | | | | 277/402 |
| 4,768,889 | A * | 9/1988 | Loser | F16J 15/3288 |
| | | | | 384/152 |
| 6,623,167 | B2 * | 9/2003 | Bass | F16C 13/02 |
| | | | | 384/537 |
| 6,682,088 | B1 * | 1/2004 | Lin | B62K 21/06 |
| | | | | 384/536 |
| 6,729,634 | B2 * | 5/2004 | Tange | B62K 21/04 |
| | | | | 280/279 |
| 2007/0223849 | A1 * | 9/2007 | Tschopp | F16C 23/045 |
| | | | | 384/192 |

* cited by examiner

*Primary Examiner* — James Pilkington

(57) ABSTRACT

A bearing seat suitable for receiving a bearing includes an annular body, a first outer-radial flange and a second outer-radial flange. The annular body includes a peripheral wall. The peripheral wall has a first end, a second end, an inner matching surface and an outer surface. A thickness difference between the maximum thickness and the minimum thickness of the peripheral wall is within 30%. A portion of the inner matching surface is suitable for contacting and matching with an outer matching surface of the bearing. The first outer-radial flange protrudes from the outer surface adjacent to the first end and extends to the first end. The second outer-radial flange protrudes from the outer surface adjacent to the second end and extends to the second end. The overall structure of the bearing seat is uniform, which can reduce warpage and deformation caused by uneven shrinkage during the injection process.

14 Claims, 4 Drawing Sheets

BEARING SEAT AND HEADSET

FIELD OF THE INVENTION

The present invention relates to a bearing seat, and more particularly to a bearing seat for a headset of a bicycle and the headset.

BACKGROUND OF THE INVENTION

In general, a headset is used in specific types of transportation to connect between a steering component and a main frame of the transportation. Taking a bicycle as an example, the steering component is, for example, a front fork of the bicycle, and the headset is connected with a seat tube and a head tube of the front fork. In general, the headset includes a bearing. An inner ring of the bearing is connected the seat tube of the front fork, and an outer ring of the bearing is clamped in the head tube by a bearing seat.

Most of existing bearing seats are formed by metal processing and the production cost is high. A small number of plastic bearing seats that are injection molded or molded have the characteristics of rapid mass production, however, due to the material characteristics of the plastic itself, it is easy to produce defective products due to cooling or humidity problems. For example, the uneven thickness of the bearing seat may result in uneven cooling speed, which leads to cracks or surface unevenness and poor matching between the bearing seat and the bearing, thereby affecting the service life and safety of the headset.

SUMMARY OF THE INVENTION

The present invention provides a bearing seat and a headset, wherein the overall structure of the bearing seat is uniform. Thus, warpage and deformation caused by uneven shrinkage can be reduced during the injection process.

The bearing seat provided by the present invention is suitable for receiving a bearing. The bearing includes an outer matching surface. The bearing seat includes an annular body, a first outer-radial flange and a second outer-radial flange. The annular body includes a peripheral wall. The peripheral wall has a first end, a second end, an inner matching surface and an outer surface. The peripheral wall has a wall thickness. A thickness difference between the maximum thickness and the minimum thickness of the peripheral wall is within 30%. A portion of the inner matching surface is suitable for contacting and matching with the outer matching surface of the bearing. The first outer-radial flange is protruded from the outer surface of the annular body adjacent to the first end and extends to the first end. The second outer-radial flange is protruded from the outer surface of the annular body adjacent to the second end and extends to the second end.

In an embodiment of the invention, the inner matching surface and the outer matching surface are arc-shaped and are in contact and closely fit.

In an embodiment of the invention, an annular recess is formed between the second outer-radial flange and the outer surface.

In an embodiment of the invention, the first outer-radial flange has a transverse abutting surface.

In an embodiment of the invention, a cross section of the annular body has a trapezoidal profile, and the wall thickness adjacent to the second end is greater than the wall thickness adjacent to the first end.

In an embodiment of the invention, the first outer-radial flange is formed with a first inner groove suitable for a first peripheral edge of a first dust cover to be embedded in, and the first dust cover is located on one side of the bearing.

In an embodiment of the invention, the second outer-radial flange is formed with a second inner groove suitable for a second peripheral edge of a second dust cover to be embedded in, and the second dust cover is located on one side of the bearing.

The headset provided by the present invention is suitable for use in a bicycle. The bicycle includes a head tube. The headset includes a bearing seat, a bearing and a tightening ring. The bearing seat includes an annular body, a first outer-radial flange and a second outer-radial flange. The annular body includes a peripheral wall. The peripheral wall has a first end, a second end, an inner matching surface and an outer surface. The peripheral wall has a wall thickness. A thickness difference between the maximum thickness and the minimum thickness of the peripheral wall is within 30%. The first outer-radial flange is protruded from the outer surface of the annular body adjacent to the first end and abuts against one end of the head tube. The annular body is arranged in the head tube. The second outer-radial flange is protruded from the outer surface of the annular body adjacent to the first end to abut against an inner wall of the head tube. The bearing includes an inner ring and an outer matching surface. The outer matching surface of the bearing is suitable for contacting and matching with a portion of the inner matching surface of the bearing seat. The tightening ring abuts against the inner ring of the bearing.

In an embodiment of the invention, the tightening ring includes an abutting part and an annular part. The annular part is arranged on the abutting part. The abutting part is arranged on a side away from the bearing. The annular part is suitable for abutting against the inner ring of the bearing.

In an embodiment of the invention, the aforementioned headset further includes a first dust cover, arranged on the abutting part of the tightening ring and located between the abutting part and the bearing. In an embodiment, the first outer-radial flange is formed with a first inner groove suitable for a first peripheral edge of the first dust cover to be embedded in.

In an embodiment of the invention, the aforementioned headset further includes a second dust cover, arranged at the second end of the peripheral wall of the annular body. In an embodiment, the second outer-radial flange is formed with a second inner groove suitable for a second peripheral edge of the second dust cover to be embedded in.

In an embodiment of the invention, the first outer-radial flange has a transverse abutting surface suitable for abutting against an edge of the head tube.

The bearing seat used in the present invention is produced by injection molding. The thickness difference between the maximum thickness and the minimum thickness of the peripheral wall of the annular body from the first end to the second end is within 30%, and the wall thickness of the peripheral wall is approximately uniform, so that the overall structure of the bearing seat 10 is uniform. Thus, warpage and deformation caused by uneven shrinkage can be reduced during the injection process.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
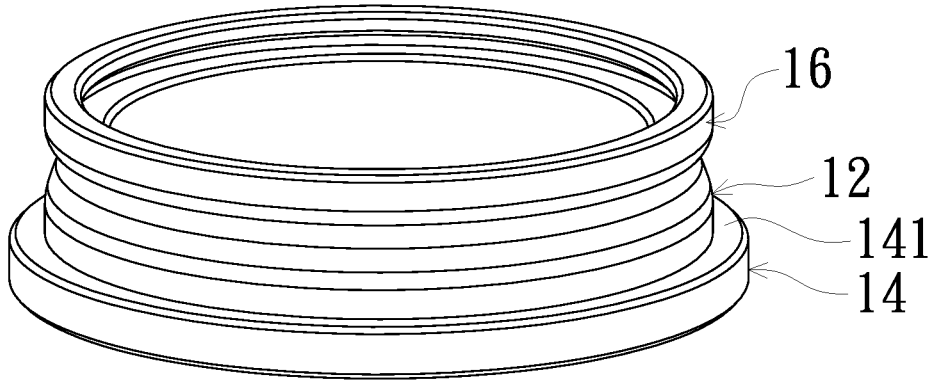
FIG. 1 is a schematic diagram of a bearing seat according to an embodiment of the present invention.
Figure 2:
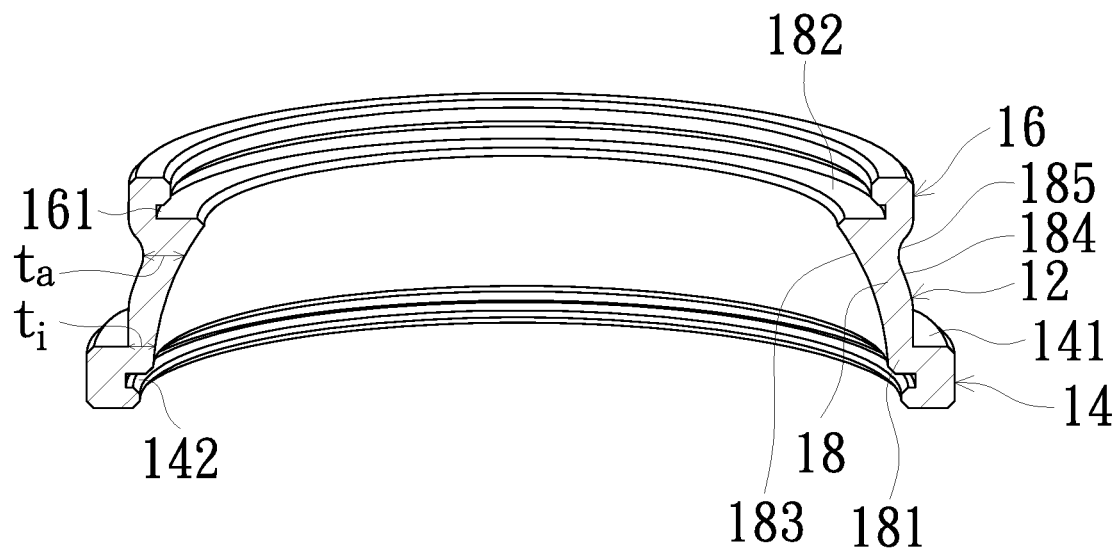
FIG. 2 is a schematic three-dimensional cross-sectional diagram of the bearing seat according to an embodiment of the present invention.

FIG. 1 is a schematic diagram of a bearing seat according to an embodiment of the present invention. FIG. 2 is a schematic three-dimensional cross-sectional diagram of the bearing seat according to an embodiment of the present invention. As shown in FIGS. 1 and 2, a bearing seat 10 includes an annular body 12, a first outer-radial flange 14 and a second outer-radial flange 16. A cross section of the annular body 12 has roughly a trapezoidal profile. As shown in FIG. 2, the annular body 12 includes a peripheral wall 18. The peripheral wall 18 has a first end 181, a second end 182, an inner matching surface 183 and an outer surface 184. The peripheral wall 18 has a wall thickness, the wall thickness of the peripheral wall has a maximum thickness $t_a$ and a minimum thickness $t_i$, and the thickness difference between the maximum thickness $t_a$ and the minimum thickness $t_i$ is within 30%, as defined by the following equation: $0 \leq (t_a - t_i)/t_a \leq 0.3$. In an embodiment, the wall thickness at the second end 182 is greater than that at the first end 181. The bearing seat 10 according to the embodiment of the present invention is suitable for receiving a bearing 20 (shown in subsequent FIGS. 3 to 5). The bearing 20 has an outer matching surface 201. The inner matching surface 183 of the peripheral wall 18 of the bearing seat 10 is suitable for contacting and matching with the outer matching surface 201 of the bearing 20. In an embodiment, the outer matching surface 201 of the bearing 20 and the inner matching surface 183 of the peripheral wall 18 of the bearing seat 10 are arc-shaped, and the outer matching surface 201 and the inner matching surface 183 are in contact and closely fit.

Continue the above description. The first outer-radial flange 14 is protruded from the outer surface 184 of the peripheral wall 18 of the annular body 12 adjacent to the first end 181 and extends to the first end 181. In an embodiment as shown in FIG. 2, the first outer-radial flange 14 extends transversely outwards from the outer surface 184 and then extends longitudinally away from the first end 181, wherein a transverse extending portion has a transverse abutting surface 141. The second outer-radial flange 16 is protruded from the outer surface 184 of the peripheral wall 18 of the annular body 12 adjacent to the second end 182 and extends to the second end 182. In an embodiment, an annular recess 185 is formed between the second outer-radial flange 16 and the outer surface 184. In an embodiment, the first outer-radial flange 14 is formed with a first inner groove 142 that is annular, and the second outer-radial flange 16 is formed with a second inner groove 161 that is annular. As shown in the subsequent FIGS. 3 to 5, the first inner groove 142 is suitable for a first peripheral edge 241 of a first dust cover 24 to be embedded in, the second inner groove 161 is suitable for a second peripheral edge 261 of a second dust cover 26 to be embedded in, and the first dust cover 24 and the second dust cover 26 are located on two sides of the bearing 20 respectively.

In the embodiment of the present invention, the bearing seat 10 is produced by injection molding. The thickness difference between the maximum thickness $t_a$ and the minimum thickness $t_i$ of the peripheral wall 18 of the annular body 12 is within 30%, and the wall thickness of the peripheral wall 18 is approximately uniform, so that the overall structure of the bearing seat 10 is uniform. Thus, warpage and deformation caused by uneven shrinkage can be reduced during the injection process.

Figure 3:
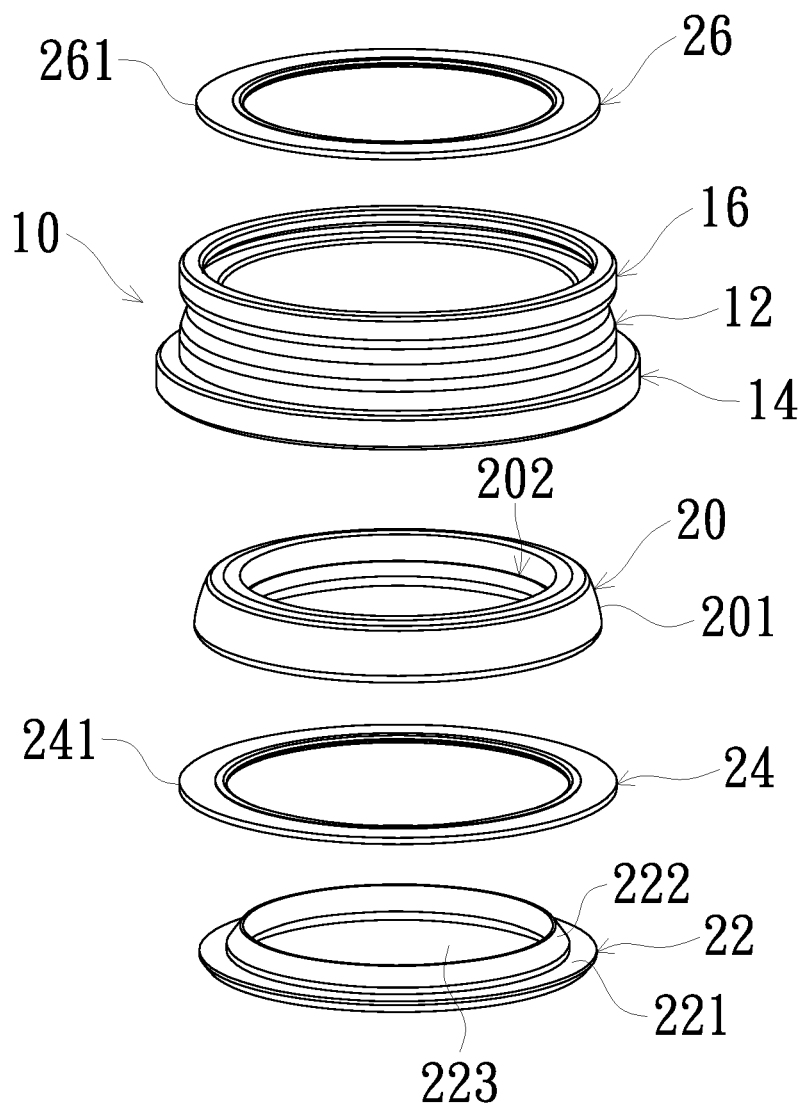
FIG. 3 is a schematic structural decomposition diagram of a headset according to an embodiment of the present invention.
Figure 4:
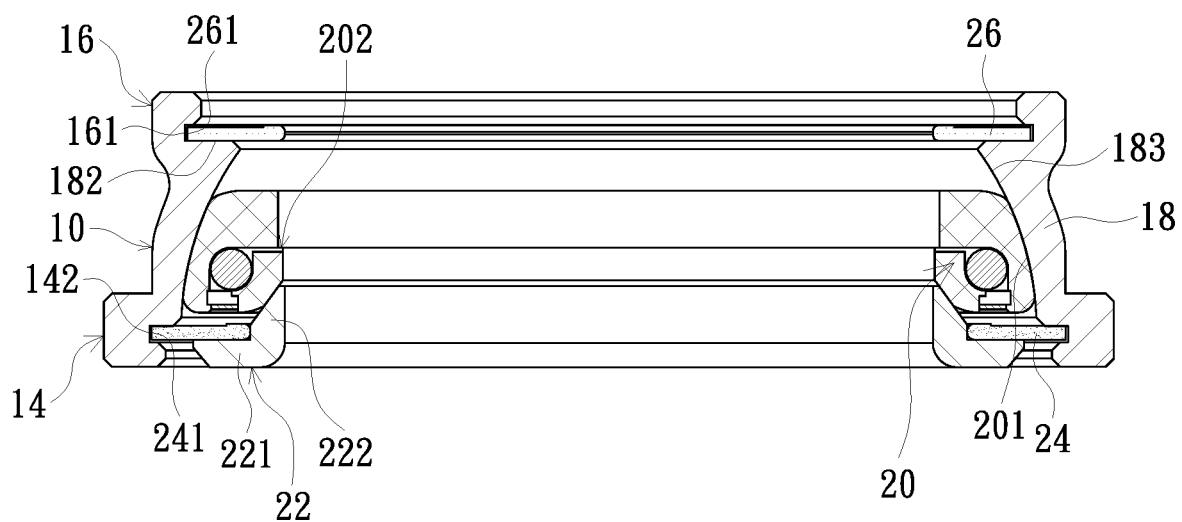
FIG. 4 is a schematic cross-sectional diagram of the headset according to an embodiment of the present invention.

FIG. 3 is a schematic structural decomposition diagram of a headset according to an embodiment of the present invention. FIG. 4 is a schematic cross-sectional diagram of the headset according to an embodiment of the present invention. As shown in FIGS. 3 and 4, the headset 100 includes a bearing seat 10, a bearing 20 and a tightening ring 22. The bearing seat 10 includes an annular body 12, a first outer-radial flange 14 and a second outer-radial flange 16. The structure of the bearing seat 10 has been described in the embodiment disclosed in FIGS. 1 and 2, and no redundant detail is to be given herein. The bearing 20 includes an inner ring 202 and an outer matching surface 201. The outer matching surface 201 of the bearing 20 is suitable for contacting and matching with a portion of an inner matching surface 183 (shown in FIG. 4) of a peripheral wall 18 (shown in FIG. 4) of the annular body 12 of the bearing seat 10. The tightening ring 22 abuts against the inner ring 202 of the bearing 20. In an embodiment, the tightening ring 22 includes an abutting part 221 and an annular part 222. The annular part 222 is arranged on the abutting part 221. The abutting part 221 is, for example, an annular flat plate with a circular through hole 223. The annular part 222 is arranged on the abutting part 221 and surrounds the periphery of the circular through hole 223. As shown in FIG. 4, the abutting part 221 of the tightening ring 22 is arranged on a side away from the bearing 20, and the annular part 222 is suitable for abutting against one side of the inner ring 202 of the bearing 20 adjacent to the tightening ring 22. In an embodiment, the tightening ring 22 is also surrounded by the bearing seat 10.

As shown in FIGS. 3 and 4, the headset 100 further includes a first dust cover 24 and a second dust cover 26, which are located on two sides of the bearing 20 respectively. The first dust cover 24 and the second dust cover 26 are, for example, annular plates. The first dust cover 24 is arranged on the abutting part 221 of the tightening ring 22 and located between the abutting part 221 and the bearing 20. A first peripheral edge 241 of the first dust cover 24 is suitable to be embedded in a first inner groove 142, that is annular, formed in the first outer-radial flange 14 of the bearing seat 10. The second dust cover 26 is arranged at a second end 182 of the peripheral wall 18 of the annular body 12 of the bearing seat 10. A second peripheral edge 261 of the second dust cover 26 is suitable to be embedded in a second inner groove 161, that is annular, formed in the second outer-radial flange 16 of the bearing seat 10.

Figure 5:
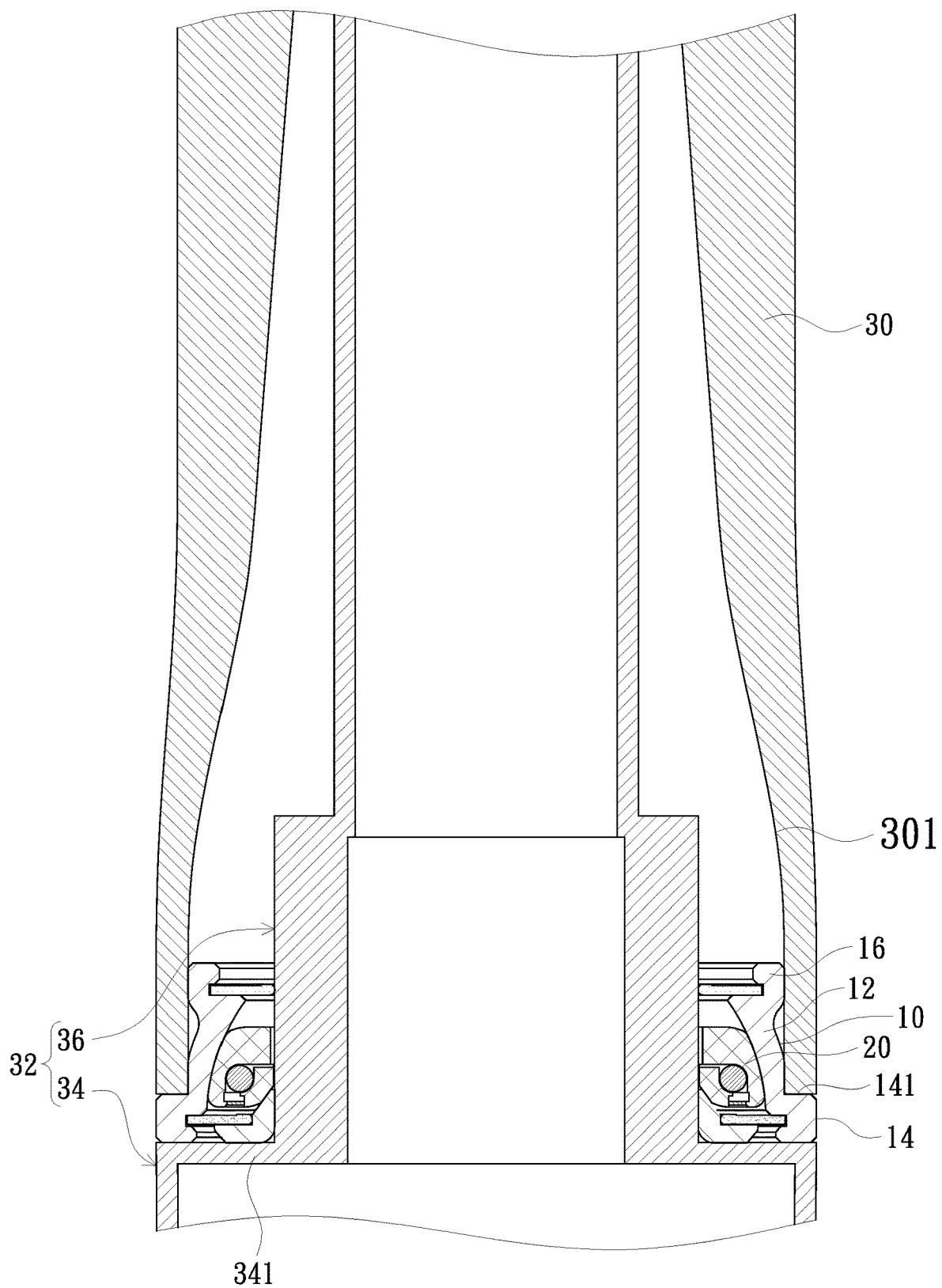
FIG. 5 is a partial schematic diagram of the headset used in a bicycle according to an embodiment of the present invention.

FIG. 5 is a partial schematic diagram of the headset used in a bicycle according to an embodiment of the present invention, wherein only a portion of a head tube 30 and a portion of a front fork structure 32 of the bicycle are shown. The front fork structure 32 includes a front fork 34 and a seat tube 36. The seat tube 36 is connected to a shoulder part 341 of the front fork 34. The seat tube 36 penetrates the head tube 30. Specifically, the head tube 30 is a portion of a bicycle frame. Two bearing seats 10 for receiving the bearing 20 are arranged in the head tube 30 and respectively applied to the two ends of the head tube 30, i.e., one end adjacent to the front fork 34 and one end adjacent to an upper cover (not shown in the figures) of the head tube 30. In this embodiment, only the one end adjacent to the shoulder part 341 of the front fork 34 is taken as an example. As shown in FIG. 5, the annular body 12 of the bearing seat 10 is arranged in the head tube 30. The first outer-radial flange 14 of the bearing seat 10 abuts against one end of the head tube 30, and the second outer-radial flange 16 of the bearing seat 10 abuts against an inner wall 301 of the head tube 30. In an embodiment, a transverse abutting surface 141 of the first outer-radial flange 14 is suitable for abutting against one end of the head tube 30 adjacent to the shoulder part 341 of the front fork 34, so that the first outer-diameter flange 14 is clamped between the head tube 30 and the shoulder part 341. The bearing 20 received in the bearing seat 10 is firmly clamped between the seat tube 36 and the bearing seat 10, so that the seat tube 36 is rotatably installed in the head tube 30 by the arrangement of the bearing seat 10 and the bearing 20. The bearing 20 is, for example, an angular contact ball (ACB) bearing, but other types of bearings may also be used.

In the headset according to the embodiment of the present invention, the thickness of the peripheral wall of the annular body is approximately uniform, so that the overall structure of the bearing seat is uniform. Thus, warpage and deformation caused by uneven shrinkage can be reduced during the injection process, thereby preventing a rotary connection between the seat tube and the head tube from being affected by warpage and deformation of the bearing seat. In addition, in the bearing seat, the annular recess formed between the second outer-radial flange and the outer surface may ensure that the second outer-radial flange may still abut against the inner wall of the head tube on the premise that the wall thickness of the peripheral wall is maintained to be approximately uniform, so as to ensure the fixation stability of the bearing seat.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bearing seat suitable for receiving a bearing, the bearing comprising an outer matching surface, and the bearing seat comprising:
   an annular body, comprising a peripheral wall, wherein the peripheral wall has a first end, a second end, an inner matching surface and an outer surface, the peripheral wall has a wall thickness, the wall thickness of the peripheral wall has a maximum thickness and a minimum thickness, and a portion of the inner matching surface is suitable for contacting and matching with the outer matching surface of the bearing, wherein a cross section of the annular body has a trapezoidal profile, and the wall thickness at the second end is greater than the wall thickness at the first end, wherein the relationship between the maximum thickness and the minimum thickness is $0 \leq (t_a - t_i)/t_a \leq 0.3$, wherein $t_a$ is the maximum thickness and $t_i$ is the minimum thickness;
   a first outer-radial flange, protruded from the outer surface of the annular body adjacent to the first end and extending to the first end; and
   a second outer-radial flange, protruded from the outer surface of the annular body adjacent to the second end and extending to the second end.

2. The bearing seat according to claim 1, wherein the inner matching surface and the outer matching surface are arc-shaped and are in contact.

3. The bearing seat according to claim 1, wherein an annular recess is formed between the second outer-radial flange and the outer surface.

4. The bearing seat according to claim 1, wherein the first outer-radial flange is formed with a first inner groove suitable for a first peripheral edge of a first dust cover to be embedded in, and the first dust cover is located on one side of the bearing.

5. The bearing seat according to claim 1, wherein the second outer-radial flange is formed with a second inner groove suitable for a second peripheral edge of a second dust cover to be embedded in, and the second dust cover is located on one side of the bearing.

6. A headset suitable for use in a bicycle, the bicycle comprising a head tube, and the headset comprising:
   a bearing seat, comprising:
      an annular body, comprising a peripheral wall, wherein the peripheral wall has a first end, a second end, an inner matching surface and an outer surface, the peripheral wall has a wall thickness, the wall thickness of the peripheral wall has a maximum thickness and a minimum thickness, wherein the relationship between the maximum thickness and the minimum thickness is $0 \leq (t_a - t_i)/t_a \leq 0.3$, wherein $t_a$ is the maximum thickness and $t_i$ is the minimum thickness;
      a first outer-radial flange, protruded from the outer surface of the annular body adjacent to the first end and abutting against one end of the head tube, wherein the annular body is arranged in the head tube; and
      a second outer-radial flange, protruded from the outer surface of the annular body adjacent to the second end to abut against an inner wall of the head tube;
   a bearing, comprising an inner ring and an outer matching surface, wherein the outer matching surface of the bearing is suitable for contacting and matching with a portion of the inner matching surface of the bearing seat; and
   a tightening ring, abutting against the inner ring of the bearing.

7. The headset according to claim 6, wherein the tightening ring comprises an abutting part and an annular part, the annular part is arranged on the abutting part, the abutting part is arranged on a side of the annular part away from the bearing, and the annular part is suitable for abutting against the inner ring of the bearing.

8. The headset according to claim 7, further comprising a first dust cover, arranged on the abutting part of the tightening ring and located between the abutting part and the bearing.

9. The headset according to claim 8, wherein the first outer-radial flange is formed with a first inner groove suitable for a first peripheral edge of the first dust cover to be embedded in.

10. The headset according to claim 6, further comprising a second dust cover, arranged at the second end of the peripheral wall of the annular body.

11. The headset according to claim 10, wherein the second outer-radial flange is formed with a second inner groove suitable for a second peripheral edge of the second dust cover to be embedded in.

12. The headset according to claim 6, wherein the inner matching surface and the outer matching surface are arc-shaped and are in contact.

13. The headset according to claim 6, wherein an annular recess is formed between the second outer-radial flange and the outer surface.

14. The headset according to claim 6, wherein a cross section of the annular body has a trapezoidal profile, and the wall thickness adjacent to the first end is greater than the wall thickness adjacent to the second end.

* * * * *